United States Patent
Khan et al.

(10) Patent No.: US 9,402,217 B1
(45) Date of Patent: Jul. 26, 2016

(54) NETWORK MANAGEMENT USING ACCESS POINT PERFORMANCE VALUES

(71) Applicant: Sprint Spectrum LP, Overland Park, KS (US)

(72) Inventors: Sameer A. Khan, Overland Park, KS (US); John Gatewood, Lees Summit, MO (US); Sunny Dubey, Overland Park, KS (US); Bhanu Prakash Voruganti, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 494 days.

(21) Appl. No.: 13/787,523

(22) Filed: Mar. 6, 2013

(51) Int. Cl.
*H04W 36/22* (2009.01)
(52) U.S. Cl.
CPC ..................... *H04W 36/22* (2013.01)
(58) Field of Classification Search
USPC .......................................... 455/436–444, 454
See application file for complete search history.

(56) References Cited

U.S. PATENT DOCUMENTS

| 2011/0256870 | A1* | 10/2011 | Park | H04W 36/30 455/436 |
| 2013/0229976 | A1* | 9/2013 | Srinivasan | H04W 36/22 370/315 |

* cited by examiner

*Primary Examiner* — Vladimir Magloire
*Assistant Examiner* — Juan C Perez Tolentino

(57) ABSTRACT

Systems and methods of providing wireless communication to a wireless device are provided. An access node of a first network associated with a first radio access technology can receive a request to establish a communication link with a first wireless device. The first wireless device can be in further communication with a second network associated with a second radio access technology different from the first radio access technology. The access node can determine that a number of second wireless devices in communication with the access node meets a threshold. When the number of second wireless devices exceeds the threshold, the access node can determine a subscription parameter based on a bandwidth allocation among the number of second wireless devices in communication with the access node. When the subscription parameter meets a criteria, the communication link can be established with the first wireless device.

19 Claims, 7 Drawing Sheets

US 9,402,217 B1

NETWORK MANAGEMENT USING ACCESS POINT PERFORMANCE VALUES

TECHNICAL BACKGROUND

Wireless communication networks implement various methods of maintaining a communication link with a wireless device as the wireless devices moves geographically. For example, a handover of a wireless device may be performed from a first access node to a second access node. In addition, the access nodes can be communicating with the network using different radio access technologies. For instance, a handover can be performed as the wireless devices moves geographically where the wireless device is handed over between a wireless cellular protocol such as CDMA, GSM, WiMAX, LTE, HSDPA, etc. to a local wireless protocol such as IEEE 802.11, WiFi, Bluetooth, Zigbee, IrDA, etc. Typically, when performing a handover from one radio access technology to another radio access technology, the respective access nodes allow the wireless device to establish a communication link regardless of network performance.

OVERVIEW

Systems and methods of providing wireless communication to a wireless device are provided. An access node of a first network associated with a first radio access technology can receive a request to establish a communication link with a first wireless device. The first wireless device can be in further communication with a second network associated with a second radio access technology different from the first radio access technology. The access node can determine that a number of second wireless devices in communication with the access node meets a threshold. When the number of second wireless devices exceeds the threshold, the access node can determine a subscription parameter based on a bandwidth allocation among the number of second wireless devices in communication with the access node. When the subscription parameter meets a criteria, the communication link can be established with the first wireless device.

DETAILED DESCRIPTION

Figure 1:
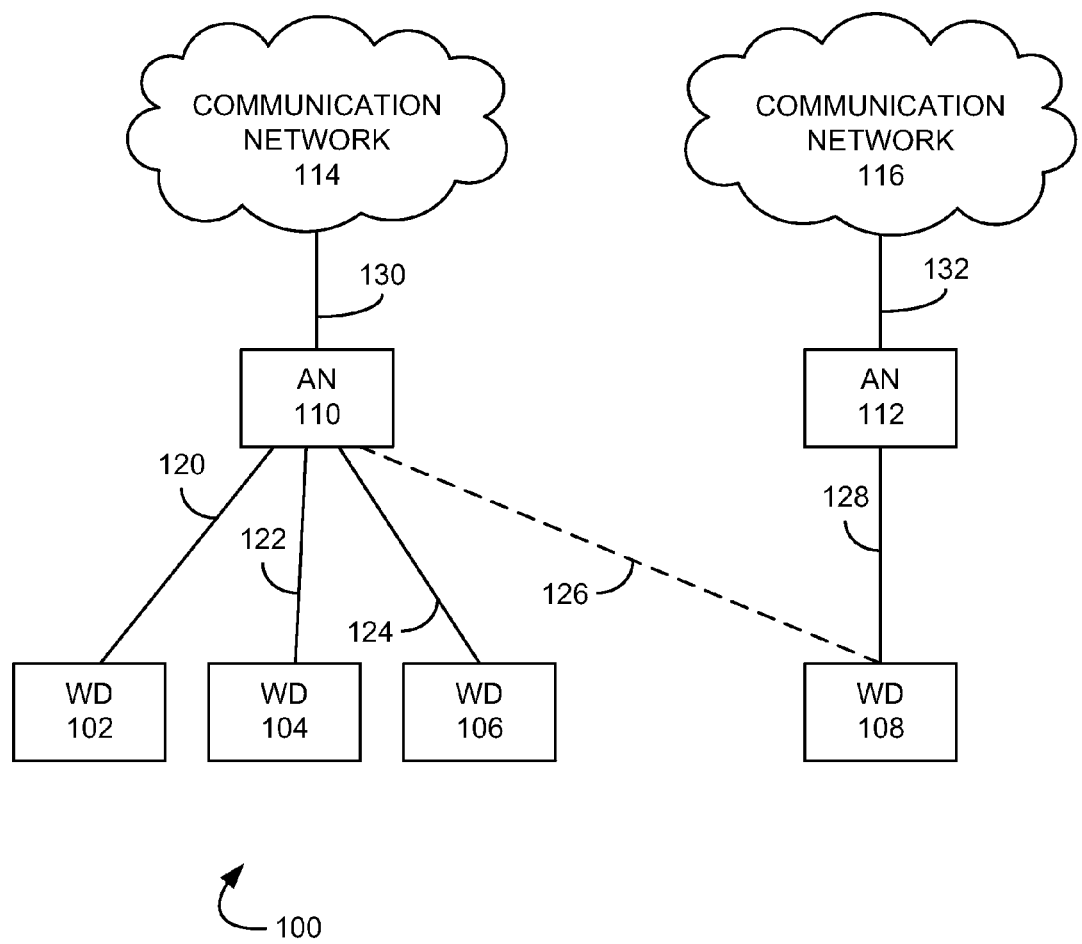
FIG. 1 illustrates an exemplary communication system to provide wireless communication to a wireless device.

FIG. 1 illustrates an exemplary communication system 100 for providing wireless communications to a wireless device. Communication system 100 comprises wireless devices 102, 104, 106, 108, an access node 110 of a first communication network 114, and an access node 112 of a second communication network 116 where communication network 114 can be associated with a first radio access technology and communication network 116 can be associated with a second radio access technology. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 110, 112 and communication networks 114, 116 which are omitted for clarity, including additional processing nodes, routers, gateways, and physical and/or wireless data links for carrying data among the various network elements.

Wireless devices 102, 104, 106, 108 can be any device configured to communicate over communication system 100 using a wireless interface. For example, wireless devices 102, 104, 106, 108 can include a cell phone, a smart phone, a computing platform such as a laptop, palmtop, or a tablet, a personal digital assistant, or an internet access device, and combinations thereof. The wireless interface can include a plurality of transceivers, where each transceiver is associated with a different radio access technology. For instance, wireless devices 102, 104, 106, 108 can include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and at least one transceiver associated with a local wireless protocol such as IEEE 802.11, wireless fidelity (WiFi), Bluetooth, Zigbee, infrared data association (IrDA), etc.

Wireless devices 102, 104, 106 are in communication with access node 110 through communication links 120, 122, 124. Wireless device 108 is in communication with access node 112 through communication link 128. Links 120, 122, 124, 128 can use various communication media, such as air, space, metal, optical fiber, or some other signal propagation path—including combinations thereof. Communication links 120, 122, 124, 128 may comprise many different signals sharing the same link. Communication links 120, 122, 124, 128 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 102, 104, 106 and access node 110 could share the same representative wireless links 120, 122, 124, but be transferred over different communication sessions, frequencies, timeslots, packets, ports, sockets, logical transport links, or in different directions—including combinations thereof.

Access node 110 can be any network node configured to communicate with wireless devices 102, 104, 106 and communication network 114. Access node 112 can be any network node configured to communicate with wireless device 108 and communication network 116. Access nodes 110, 112 can be capable of providing wireless communications to wireless devices 102, 104, 106, 108. For example, access node 110, 112 can be selected from a base transceiver station, a radio base station, an eNodeB device, or an enhanced eNodeB device.

Access node 110 can be associated with a first radio access technology and access node 112 can be associated with a second radio access technology different from the first radio access technology. For example, access node 110 can be associated with a local wireless protocol such as IEEE 802.11, WiFi, Bluetooth, Zigbee, and IrDA and access node 112 can be associated with a wireless cellular protocol such as CDMA, GSM, WiMAX, LTE, and HSDPA. Access node 110 can be a stand-alone device or it can be multi-mode device operating using a local wireless protocol. For instance, a wireless device having multi-mode functionality can be enabled in a mobile hotspot mode such that the wireless device communicates over communication network 114 using a local wireless protocol.

In an embodiment, access node 110 can determine whether a communication link can be established with wireless device 108. For example, access node 110 can receive a request to establish a communication link with wireless device 108, determine a number of wireless devices in active communication with access node 110, determine a subscription parameter associated with access node 110, and establish a communication link with wireless device 108 when the subscription parameter meets a criteria.

Access node 110 can comprise a processor and associated circuitry to execute or direct the execution of computer-readable instructions to obtain information. Access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface.

Access node 110 can be in communication with communication network 114 through communication link 130. Access node 112 can be in communication with communication network 116 through communication link 132. Communication links 130, 132 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 130, 132 can be a direct link or might include various equipment, intermediate components, systems, and networks. Links 130, 132 can include multiple signals operating in a single pathway in a similar manner as wireless links 120, 122, 124, 128.

Communication networks 114, 116 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication networks 114, 116 can be capable of carrying data, for example, to support voice and data communications by a wireless device such as wireless devices 102, 104, 106, 108. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 114, 116 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 114, 116 can also comprise additional base stations, controller nodes, telephony switches, internet routers, network gateways, computer systems, communication links, or some other type of communication equipment, and combinations thereof.

Wireless devices 102, 104, 106, 108 can operate in various states such as active state and idle state. During active states, wireless devices 102, 104, 106, 108 can actively transmit and/or receive information from the respective communication networks 114, 116 such as phone calls and data transfer.

A device subscription threshold can be established for each access node 110, 112. The device subscription threshold can be a maximum number of wireless devices that can establish a communication link with an access node. The device subscription threshold associated with each access node 110, 112 can be determined in various ways. For example, it can be predetermined by network settings, dynamically determined based on current network operations, etc.

In an embodiment, wireless devices 102, 104, 106 can establish communication links 120, 122, 124 with access node 110. Active communication sessions can be initiated after wireless devices 102, 104, 106 have been authenticated to communicate over communication links 120, 122, 124 with network 114 of a first radio access technology. Wireless device 108 can initiate an active communication session over communication network 116 of a second radio access technology different from the first radio access technology over communication link 128. While wireless device 108 is in communication with communication network 116, wireless device 108 can detect access node 110 and send a request to establish a communication link to access node 110 over channel request link 126. Alternatively, access node 110 can detect wireless device 108 and initiate establishing a communication link 126.

In an alternative embodiment, wireless device 108 can request a network link characteristic from access node 110 over communication link 126. The network link characteristic can be any characteristic such as the quality of signal between the wireless device 108 and access node 110. For example, access node 110 can provide at least one of a RSSI value, a throughput value, a signal-to-noise ratio value, and a radio type value. The wireless device 108 can compare the network link characteristic with a known network link characteristic of the communication link 128 between wireless device 108 and access node 112. When the wireless device 108 determines that the network link characteristic of communication link 126 is better than the network link characteristic of communication link 128, wireless device 108 can then send a request to establish a communication link to access node 110.

In operation, access node 110 can determine the number of wireless devices 102, 104, 106 in communication with access node 110 after receiving the request from wireless device 108. When the access node 110 determines that granting wireless device 108 communication access to access node 110 would make the total number of wireless devices in communication with access node 110 less than or equal to the device subscription threshold, the access node 110 can instruct the wireless device to establish a communication link and initiate authentication over network 114. In addition, access node 110 can instruct wireless device 108 to disable a transceiver associated with the radio technology associated with communication network 116.

When the access node 110 determines that granting the wireless device 108 communication access to the access node 110 would exceed the device subscription threshold, access node 110 can determine a subscription parameter. The subscription parameter can be based on a bandwidth allocation among the number of devices in communication with access node 110. For example, the subscription parameter can be based on the number of wireless devices in communication with access node 110 and an oversubscription value of access node 110. An oversubscription value can be based on bandwidth allocations assigned to each wireless device. For instance, the oversubscription value can be the total amount of bandwidth necessary if all of the wireless devices required a maximum bandwidth at the same time. Bandwidth allocation for each device can be based on applications used by the wireless device. For example, mobile voice services, mobile data services, push-to-talk services, internet services, web browsing, email, pictures, picture messaging, video, video messaging, audio, voicemail, music, MP3's, ring tones, stock tickers, new alerts, etc. Due to the nature of network communications, total bandwidth allocation is generally not used and can be reallocated to wireless device 108.

The access node 110 can than compare the subscription parameter with a network criteria. Network criteria can be a threshold variable representative of a maximum bandwidth allocation that would not interfere with a user's experience. Various factors could be considered to interfere with a user's experience such as prioritized bandwidth provisions, applications running of the wireless devices, and type of traffic. For example, a wireless device can be designated higher priority in the network over other wireless devices, each application can have requirements such as data rate requirements, maximum latency requirements, and/or error correction rate requirements, and the ratio of signaling to bearer traffic can vary. The network criteria can be a single value or a range of values and can be determined in various ways. For example, the network criteria can be predetermined by the network, dynamically calculated, etc.

When the access node 110 determines that the subscription parameter is less than the network criteria, the access node 110 can instruct the wireless device to establish a communication link and initiate authentication over network 114. In addition, access node 110 can instruct wireless device 108 to disable a transceiver associated with the radio technology of communication network 116.

When the access node 110 determines that the subscription parameter is greater than or equal to the subscription parameter, the access node 110 can deny the request to establish the communication link and instruct the wireless device 108 to disable a transceiver associated with the radio technology of communication network 114.

Figure 2:
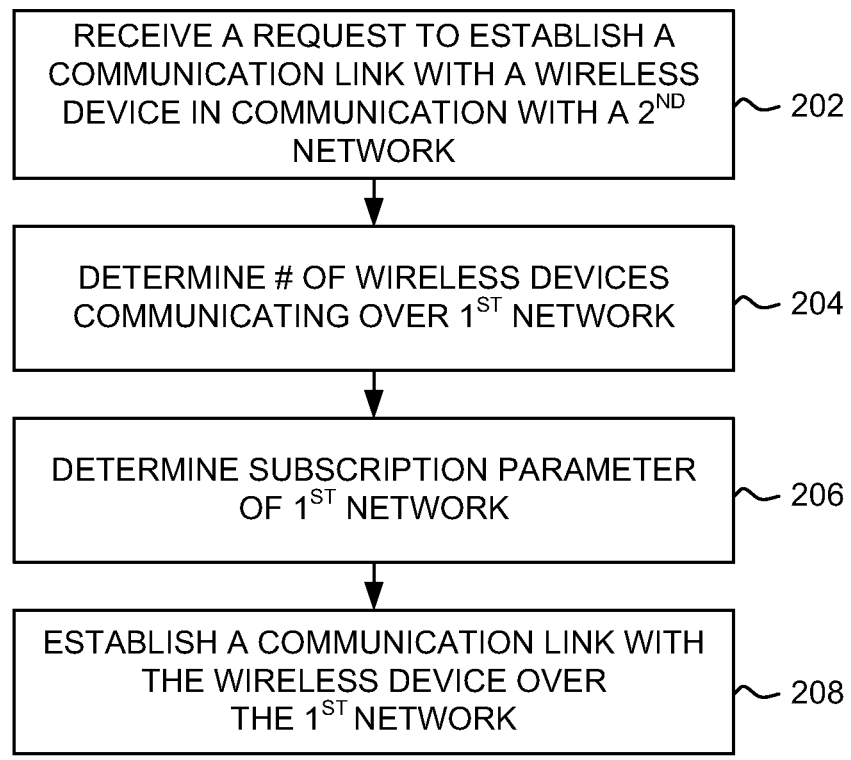
FIG. 2 illustrates an exemplary method of providing wireless communication to a wireless device.

FIG. 2 illustrates a flow chart of an exemplary method for providing wireless communications to a wireless device. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

An access node of a first network can receive a request to establish a communication link with a wireless device in communication with a second network at 202. In addition, the first network can communicate using a radio access technology different from the radio access technology of a second network. For example, access node 110 associated with network 114 that communicates using a wireless protocol can receive the request from wireless device 108 that is in communication with network 116, where network 116 is associated with a cellular protocol.

The access node of the first network can determine the number of wireless devices communicating over the first network at 204. For example, access node 110 can determine the number of wireless devices in active communication with access node 110. At 206, the access node of the first network can determine a subscription parameter of the first network. For example, access node 110 can determine a subscription parameter based on the number of wireless devices in communication with the access node 110 and the total bandwidth allocation associated with the number of wireless devices in communication with the access node 110.

When the subscription parameter meets a criteria, the access node of the first network can instruct the wireless device to establish a communication link over the first network at 208. For example, access node 110 can respond to the request from wireless device 108 and instruct the wireless device to initiate authentication after the communication link is established. In addition, access node 110 can instruct wireless device 108 to disable a transceiver associated with the radio technology of the second network.

Figure 3:
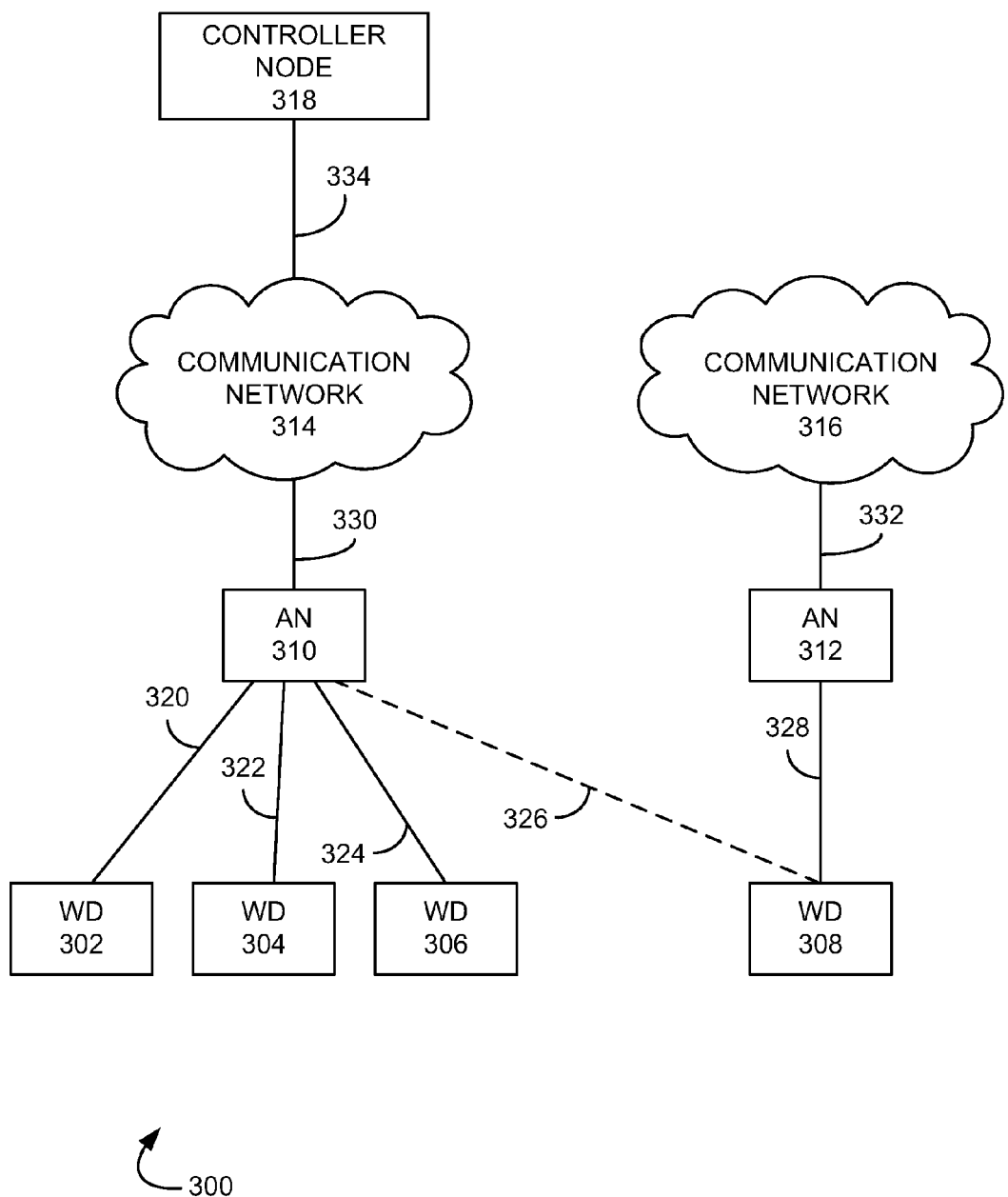
FIG. 3 illustrates another exemplary communication system to provide wireless communication to a wireless device.

FIG. 3 illustrates an exemplary communication system 300 for providing wireless communications to a wireless device. Communication system 300 comprises wireless devices 302, 304, 306, 308, an access node 310 of a first communication network 314, an access node 312 of a second communication network 316, and a controller node 318. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 310, 312 and communication networks 314, 316 which are omitted for clarity, including additional processing nodes, routers, gateways, and physical and/or wireless data links for carrying data among the various network elements.

Wireless devices 302, 304, 306, 308 can be any device configured to communicate over communication system 300 using a wireless interface. For example, wireless devices 302, 304, 306, 308 can include a cell phone, a smart phone, a computing platform such as a laptop, palmtop, or a tablet, a personal digital assistant, or an internet access device, and combinations thereof. The wireless interface can include a plurality of transceivers, where each transceiver is associated with a different radio access technology. For instance, wireless devices 302, 304, 306, 308 can include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and at least one transceiver associated with a local wireless protocol such as IEEE 802.11, wireless fidelity (WiFi), Bluetooth, Zigbee, (infrared data association) IrDA, etc.

Wireless devices 302, 304, 306 are in communication with access node 310 through communication links 320, 322, 324. Wireless device 308 is in communication with access node 312 through communication link 328. Links 320, 322, 324, 328 can use various communication media, such as air, space, metal, optical fiber, or some other signal propagation path— including combinations thereof. Communication links 320, 322, 324, 328 may comprise many different signals sharing the same link. Communication links 320, 322, 324, 328 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, 306 and access node 310 could share the same representative wireless links 320, 322, 324, but be transferred over different communication sessions, frequencies, timeslots, packets, ports, sockets, logical transport links, or in different directions—including combinations thereof.

Access node 310 can be any network node configured to communicate with wireless devices 302, 304, 306 and communication network 314. Access node 312 can be any network node configured to communicate with wireless device 308 and communication network 316. Access nodes 310, 312 can be capable of providing wireless communications to wireless devices 302, 304, 306, 308. For example, access node 310, 312 can be selected from a base transceiver station, a radio base station, an eNodeB device, or an enhanced eNodeB device.

Access node 310 can be associated with a first radio access technology and access node 312 can be associated with a second radio access technology different from the first radio access technology. For example, access node 310 can be associated with a local wireless protocol such as IEEE 802.11, WiFi, Bluetooth, Zigbee, and IrDA and access node 312 can be associated with a wireless cellular protocol such as CDMA, GSM, WiMAX, LTE, and HSDPA. Access node 310 can be a stand-alone device or it can be multi-mode device operating using a local wireless protocol. For instance, a wireless device having multi-mode functionality can be enabled in a mobile hotspot mode such that the wireless device communicates over communication network 314 using a local wireless protocol.

Communication networks 314, 316 can be any type of network or internetwork. Networks 314, 316 may comprise a computer, a network, or a collection of computers and networks that couple, link, or otherwise operatively provide wireless devices 302, 304, 306, 308 with communication service. It should be understood that networks 314, 316 may comprise secondary data networks. For example, networks 314, 316 may include a backhaul network, a local network, a long distance network, a packet network, or any combination thereof, as well as other types of networks. Networks 314, 316 may be or include an access service network (ASN), an access service network gateway (ASN-GW), wireless local access network access gateway (WAG), packet data gateway (PDG), mobile switching center (MSC) and packet data serving node (PDSN).

Communication networks 314, 316 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication networks 314, 316 can be capable of carrying data, for example, to support voice and data communications by a wireless device such as wireless devices 302, 304, 306, 308. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 314, 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 314, 316 can also comprise additional base stations, controller nodes, telephony switches, internet routers, network gateways, computer systems, communication links, or some other type of communication equipment, and combinations thereof.

Communication network 314 can be in communication with access node 310 through communication link 330 and with controller node 318 through communication link 334. Communication network 316 can be in communication with access node 312 through communication link 332. Communication links 330, 332, 334 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 330, 332, 334 can be a direct link or might include various equipment, intermediate components, systems, and networks. Links 330, 332, 334 can include multiple signals operating in a single pathway in a similar manner as wireless links 320, 322, 324, 328.

Controller node 318 can be a network element associated with a first communication network 314. Controller node 318 can be any element configured to communicate information over a network or control communication of the information over the first network. Controller node 318 can be a standalone computing device, computing system, or network component, and can be accessible, for example, by a wired or wireless connection, or through an indirect connection such as through a computer network or communication network. For example, controller node 318 can include a mobility management entity (MME), a serving gateway (SGW), a public data network gateway (PGW), a Home Subscriber Server (HSS), a Policy Control and Charging Rules Function (PCRF), etc.

In an embodiment, controller node 318 can determine whether a communication link can be established with wireless device 108. For example, wireless device 308 can send a request to establish a communication to access node 310. Access node 310 can communicate the request to controller node 318. Controller node 318 can determine a number of wireless devices in active communication with access node 310, determine a subscription parameter associated with access node 310, and send a response to the wireless device 308 to establish a communication link with access node 310 when the subscription parameter meets a criteria.

Controller node 318 can comprise a processor and associated circuitry to execute or direct the execution of computer-readable instructions to obtain information. Controller node 318 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 318 can receive instructions and other input at a user interface.

Wireless devices 302, 304, 306, 308 can operate in various states such as active state and idle state. During active states, wireless devices 302, 304, 306, 308 can actively transmit and/or receive information from the respective communication networks 314, 316 such as phone calls and data transfer where the radio access technology of communication network 314 is different from the radio access technology of communication network 316.

A device subscription threshold can be established for each access node 310, 312. The device subscription threshold can be a maximum number of wireless devices that can establish a communication link with an access node. The device subscription threshold associated with each access node 310, 312 can be determined in various ways. For example, it can be predetermined by network settings, dynamically determined based on current network operations, etc.

In an embodiment, wireless devices 302, 304, 306 can establish communication links 320, 322, 324 with access node 310. Active communication sessions can be initiated after wireless devices 302, 304, 306 have been authenticated to communicate over communication links 320, 322, 324 with network 314 of a first radio access technology. Wireless device 308 can initiate an active communication session over communication network 316 of a second radio access technology different from the first radio access technology over communication link 328. While wireless device 308 is in communication with communication network 316, wireless device 308 can detect access node 310 and send a request to establish a communication link to access node 310 over channel request link 326.

In operation, access node 310 can communicate the request to controller node 318 and controller node 318 can determine the number of wireless devices 302, 304, 306 in communication with access node 310. When the controller node 318 determines that granting wireless device 308 communication access to access node 310 would make the total number of wireless devices in communication with access node 310 less than or equal to the device subscription threshold, the controller node can instruct the wireless device to establish a communication link and initiate authentication over network 314. In addition, controller node 318 can instruct wireless device 308 to disable a transceiver associated with the radio technology associated with communication network 316.

When the controller node 318 determines that granting wireless device 308 communication access to access node 310 would exceed the device subscription threshold, controller node 318 can determine a subscription parameter. The subscription parameter can be based on a bandwidth allocation among the number of devices in communication with access node 310. For example, the subscription parameter can be based on the number of wireless devices in communication with access node 310 and an oversubscription value of access node 310. An oversubscription value can be based on bandwidth allocation assigned to each wireless device. For instance, the oversubscription value can be the total amount of bandwidth necessary if all of the wireless devices required a maximum bandwidth at the same time. Bandwidth allocation for each device can be based on applications used by the wireless device. For example, mobile voice services, mobile data services, push-to-talk services, internet services, web browsing, email, pictures, picture messaging, video, video messaging, audio, voicemail, music, MP3's, ring tones, stock tickers, new alerts, etc.

Controller node 318 can then compare the subscription parameter with a network criteria. The network criteria can be a threshold variable representative of a maximum bandwidth allocation that would not interfere with a user's experience. Various factors could be considered to interfere with a user's experience such as prioritized bandwidth provisions, applications running of the wireless devices, and type of traffic. For example, a wireless device can be designated higher priority in the network over other wireless devices, each application can have requirements such as data rate requirements, maximum latency requirements, and/or error correction rate requirements, and the ratio of signaling to bearer traffic can vary. The network criteria can be a single value or a range of values and can be determined in various ways. For example, the network criteria can be predetermined by the network, dynamically calculated, etc.

When the controller node 318 determines that the subscription parameter is less than the network criteria, the controller node 318 can instruct the wireless device 308 to establish a communication link with access node 310 and initiate authentication over network 314. In addition, controller node 318 can instruct wireless device 308 to disable a transceiver associated with the radio technology of communication network 316.

When the controller node 318 determines that the subscription parameter is greater than or equal to the network criteria, the controller node 318 can deny the request to establish the communication link and instruct the wireless device 308 to disable a transceiver associated with the radio technology of communication network 314.

Figure 4:
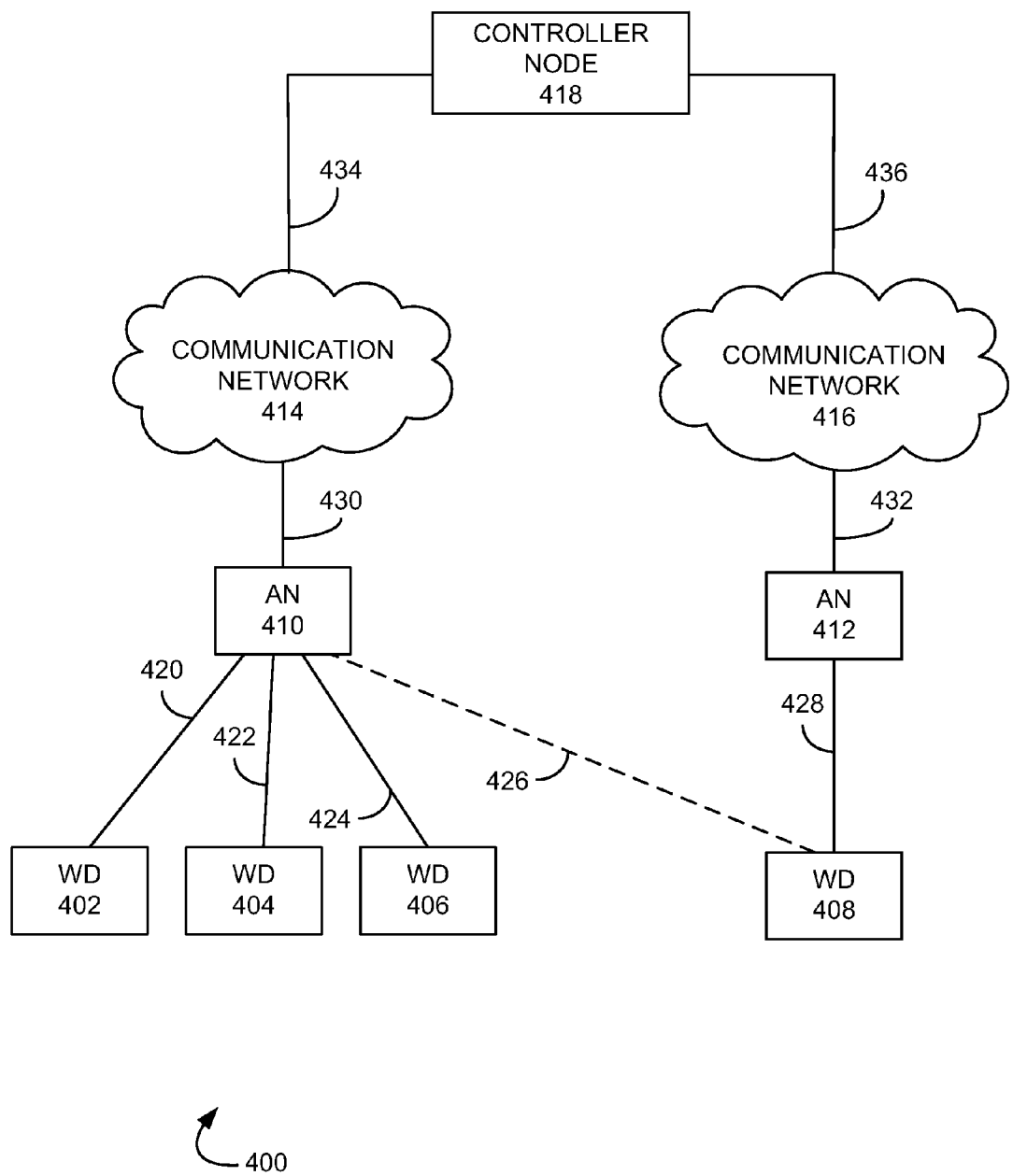
FIG. 4 illustrates another exemplary communication system to provide wireless communication to a wireless device.

FIG. 4 illustrates an exemplary communication system 400 for providing wireless communications to a wireless device. Communication system 400 comprises wireless devices 402, 404, 406, 408, an access node 410 of a first communication network 414, an access node 412 of a second communication network 416, and a controller node 418. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 410, 412 and communication networks 414, 416 which are omitted for clarity, including additional processing nodes, routers, gateways, and physical and/or wireless data links for carrying data among the various network elements.

Wireless devices 402, 404, 406, 408 can be any device configured to communicate over communication system 400 using a wireless interface. For example, wireless devices 402, 404, 406, 408 can include a cell phone, a smart phone, a computing platform such as a laptop, palmtop, or a tablet, a personal digital assistant, or an internet access device, and combinations thereof. The wireless interface can include a plurality of transceivers, where each transceiver is associated with a different radio access technology. For instance, wireless devices 402, 404, 406, 408 can include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and at least one transceiver associated with a local wireless protocol such as IEEE 802.11, wireless fidelity (WiFi), Bluetooth, Zigbee, (infrared data association) IrDA, etc.

Wireless devices 402, 404, 406 are in communication with access node 410 through communication links 420, 422, 424. Wireless device 408 is in communication with access node 412 through communication link 428. Links 420, 422, 424, 428 can use various communication media, such as air, space, metal, optical fiber, or some other signal propagation path—including combinations thereof. Communication links 420, 422, 424, 428 may comprise many different signals sharing the same link. Communication links 420, 422, 424, 428 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 402, 404, 406 and access node 410 could share the same representative wireless links 420, 422, 424, but be transferred over different communication sessions, frequencies, timeslots, packets, ports, sockets, logical transport links, or in different directions—including combinations thereof.

Access node 410 can be any network node configured to communicate with wireless devices 402, 404, 406 and communication network 414. Access node 412 can be any network node configured to communicate with wireless device 408 and communication network 416. Access nodes 410, 412 can be capable of providing wireless communications to wireless devices 402, 404, 406, 408. For example, access node 410, 412 can be selected from a base transceiver station, a radio base station, an eNodeB device, or an enhanced eNodeB device.

Access node 410 can be associated with a first radio access technology and access node 412 can be associated with a second radio access technology different from the first radio access technology. For example, access node 410 can be associated with a local wireless protocol such as IEEE 802.11, WiFi, Bluetooth, Zigbee, and IrDA and access node 412 can be associated with a wireless cellular protocol such as CDMA, GSM, WiMAX, LTE, and HSDPA. Access node 410 can be a stand-alone device or it can be multi-mode device operating using a local wireless protocol. For instance, a wireless device having multi-mode functionality can be enabled in a mobile hotspot mode such that the wireless device communicates over communication network 414 using a local wireless protocol.

Communication networks 414, 416 can be any type of network or internetwork. Networks 414, 416 may comprise a computer, a network, or a collection of computers and networks that couple, link, or otherwise operatively provide wireless devices 402, 404, 406, 408 with communication service. It should be understood that networks 414, 416 may comprise secondary data networks. For example, networks 414, 416 may include a backhaul network, a local network, a long distance network, a packet network, or any combination thereof, as well as other types of networks. Networks 414, 416 may be or include an access service network (ASN), an access service network gateway (ASN-GW), wireless local access network access gateway (WAG), packet data gateway (PDG), mobile switching center (MSC) and packet data serving node (PDSN).

Communication networks 414, 416 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication networks 414, 416 can be capable of carrying data, for example, to support voice and data communications by a wireless device such as wireless devices 402, 404, 406, 408. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 414, 416 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 414, 416 can also comprise additional base stations, controller nodes, telephony switches, internet routers, network gateways, computer systems, communication links, or some other type of communication equipment, and combinations thereof.

Communication network 414 can be in communication with access node 410 through communication link 430 and with controller node 418 through communication link 434. Communication network 416 can be in communication with access node 412 through communication link 432 and with controller node 418 through communication link 436. Communication links 430, 432, 434, 436 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 430, 432, 434, 436 can be a direct link or might include various equipment, intermediate components, systems, and networks. Links 430, 432, 434, 436 can include multiple signals operating in a single pathway in a similar manner as wireless links 420, 422, 424, 428.

Controller node 418 can be a network element in communication with a communication network 414 and communication network 416 and can be associated with network 414 and/or network 416. Controller node 418 can be any element configured to communicate information over a network or control communication of the information over network 414 and/or network 416. Controller node 418 can be a standalone computing device, computing system, or network component, and can be accessible, for example, by a wired or wireless connection, or through an indirect connection such as through a computer network or communication network. For example, controller node 418 can include a mobility management entity (MME), a serving gateway (SGW), a public data network gateway (PGW), a Home Subscriber Server (HSS), a Policy Control and Charging Rules Function (PCRF), etc.

In an embodiment, controller node 418 can determine whether to transfer a wireless device from one access node to another access node. For example, controller node 418 can monitor the number of wireless devices 402, 404, 406, 408 in communication with each access node 410, 412 and determine whether to transfer a wireless device from one access node to the other. While wireless devices 402, 404, 406, 408 are illustrated in communication with access nodes 410, 412, any number of wireless devices can be in communication with access nodes 410, 412. When the controller node determines to transfer a wireless device from one access node to the other, the controller node can determine a subscription parameter associated with the access node that will receive the wireless device after transfer, and instruct the wireless device to establish a communication link with the new access node when the subscription parameter meets a criteria.

Controller node 418 can comprise a processor and associated circuitry to execute or direct the execution of computer-readable instructions to obtain information. Controller node 418 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 418 can receive instructions and other input at a user interface.

Wireless devices 402, 404, 406, 408 can operate in various states such as active state and idle state. During active states, wireless devices 402, 404, 406, 408 can actively transmit and/or receive information from the respective communication networks 414, 416 such as phone calls and data transfer where the radio access technology of communication network 414 is different from the radio access technology of communication network 416.

In an embodiment, controller node 418 can determine a device subscription threshold for each access node 410, 412. The device subscription threshold can be a maximum number of wireless devices that can establish a communication link with an access node. The device subscription threshold associated with each access node 410, 412 can be determined in various ways. For example, it can be predetermined by network settings, dynamically determined based on current network operations, etc.

In operation, the controller node 418 can determine the number of wireless devices in active communication with each access node 410, 412 and compare the number of wireless devices to the device subscription threshold of each respective access node 410, 412. Based on the comparison of the number of wireless devices and the device subscription thresholds, the controller node 418 can determined whether to transfer a wireless device from one access node to another access node. The decision to transfer the wireless device can be based on at least one of various factors such as the load of each access node, a traffic level of each access node, a type of traffic through each node, a type of application used by each wireless device, a signal characteristic such as signal strength, signal-to-noise ratio, etc., and unused bandwidth at each access node.

When the controller node 418 determines to transfer a wireless device from one access node to another access node, the controller node 418 can determine a subscription parameter associated with the access node that will receive the wireless device after the transfer. For example, when controller node 418 determines to transfer wireless device 408 from access node 412 of network 416 associated with a first radio access technology to access node 410 of network 414 associated with a second radio access technology different from the first radio access technology, controller node 418 can determine a subscription parameter of access node 414. The subscription parameter can be based on a bandwidth allocation among the number of devices in communication with access node 410. For example, the subscription parameter can be based on the number of wireless devices in communication with access node 410 and an oversubscription value of access node 410. An oversubscription value can be based on bandwidth allocation assigned to each wireless device. For instance, the oversubscription value can be the total amount of bandwidth necessary if all the wireless devices required a maximum bandwidth at the same time. Bandwidth allocation for each device can be based on applications used by the wireless devices. For example, mobile voice services, mobile data services, push-to-talk services, internet services, web browsing, email, pictures, picture messaging, video, video messaging, audio, voicemail, music, MP3's, ring tones, stock tickers, new alerts, etc.

Controller node 418 can compare the subscription parameter with a network criteria. The network criteria can be a threshold variable representative of a maximum bandwidth allocation that would not interfere with a user's experience. Various factors could be considered to interfere with a user's experience such as prioritized bandwidth provisions, applications running of the wireless devices, and type of traffic. For example, a wireless device can be designated higher priority in the network over other wireless devices, each application can have requirements such as data rate requirements, maximum latency requirements, and/or error correction rate requirements, and the ratio of signaling to bearer traffic can vary. The network criteria can be a single value or a range of values and can be determined in various ways. For example, the network criteria can be predetermined by the network, dynamically calculated, etc.

When the controller node 418 determines that the subscription parameter is less than the network criteria, the controller node 418 can instruct the wireless device 408 to establish a communication link with access node 410 and initiate authentication over network 414. In addition, controller node 418 can instruct wireless device 408 to disable a transceiver associated with the radio technology of communication network 416. Alternatively, when the controller node 418 determines that the subscription parameter is greater than or equal to the network criteria, the controller node 418 can do nothing such that the wireless device 408 is unaware that transfer was contemplated.

Figure 5:
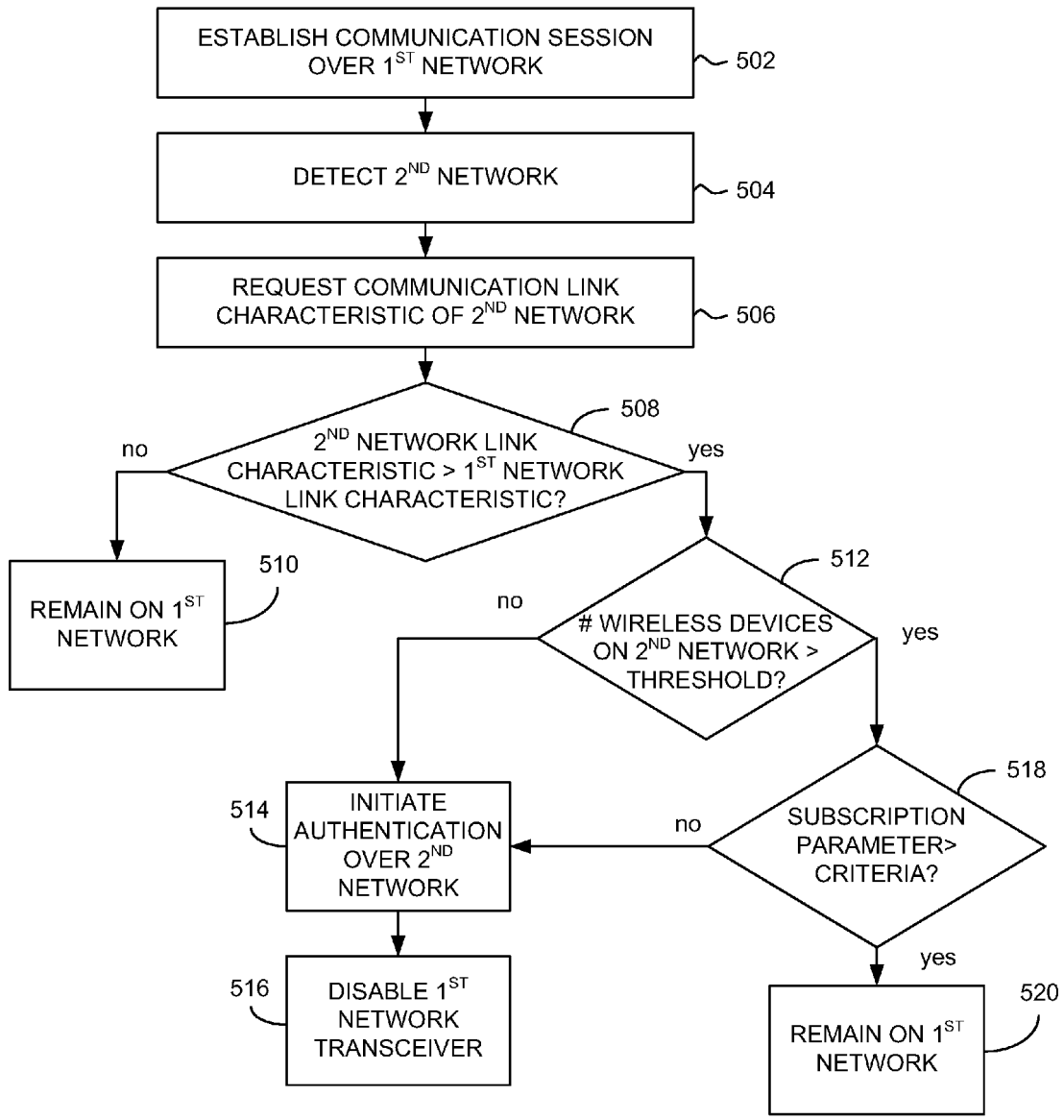
FIG. 5 illustrates another exemplary method of providing wireless communication to a wireless device.
Figure 6:
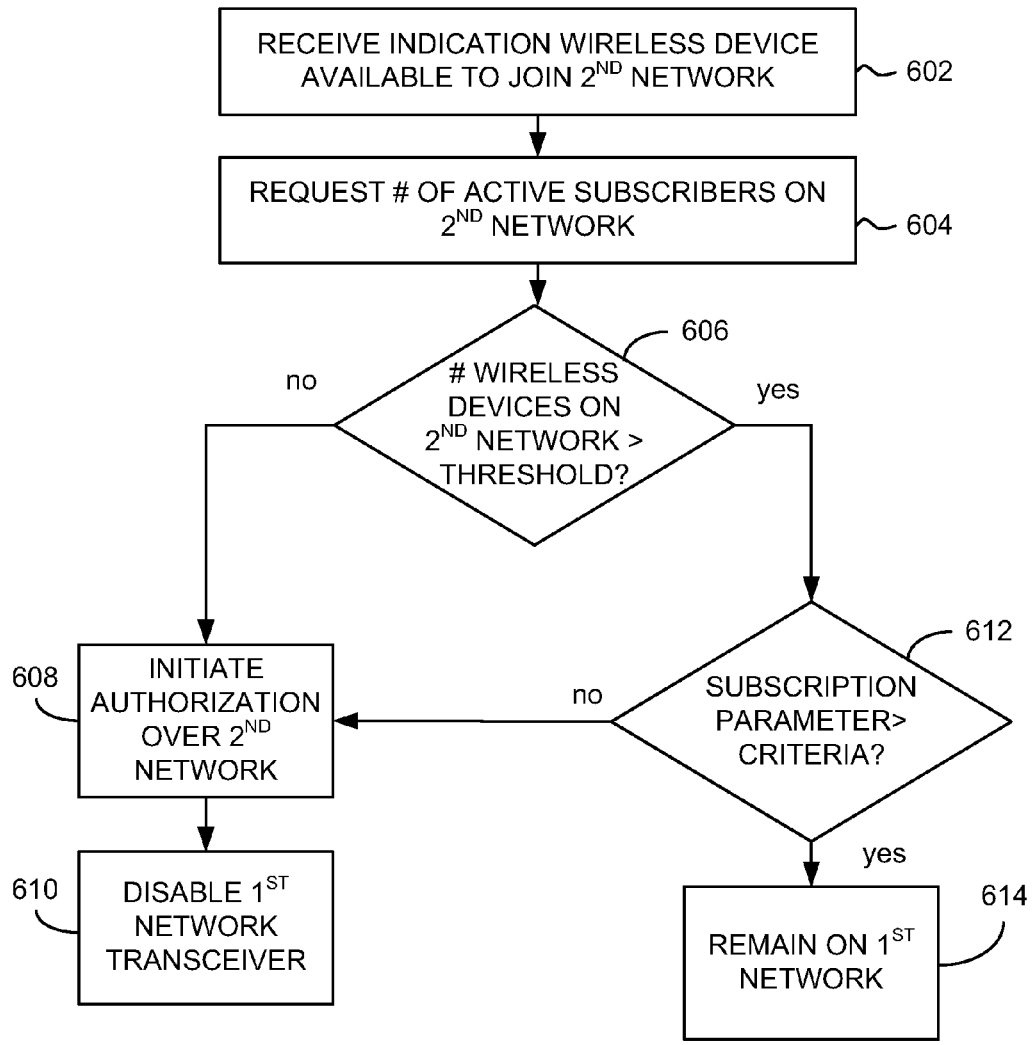
FIG. 6 illustrates another exemplary method of providing wireless communication to a wireless device.

FIGS. 5 and 6 illustrate a flow chart of exemplary methods for providing wireless communications to a wireless device. The methods will be discussed with reference to the exemplary communication systems 100, 300, 400 illustrated in FIGS. 1, 3, 4. However, the methods can be implemented with any suitable communication systems. In addition, although FIGS. 5 and 6 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

As illustrated in FIG. 5, a wireless device can establish a communication session over a first network at 502. For example, wireless device 108 can establish a communication link 128 with access node 112 and authenticate over network 116 to establish a communication session using a first radio access technology. At 504, the wireless device can detect a second network and request a communication link characteristic of the second network at 506. For example, wireless device 108 can detect access node 110 and send a request for a communication link characteristic from access node 110. The communication link characteristic can include at least one of a RSSI value, a throughput value, a signal-to-noise ratio value, and a radio type value.

The wireless device can compare the communication link characteristic of the second network with a known communication link characteristic of the first network in 508. When the wireless device determines that the communication link characteristic of the first network is better than the communication link characteristic of the second network, the wireless device remains in communication with the first network at 510. In an alternative embodiment, the wireless device can disable the transceiver associated with the radio access technology of the second network.

When the wireless device determines that the communication link characteristic of the second network is better than the communication link characteristic of the first network, the wireless device can send a request to establish a communication link with the access node of the second network. After receiving the request, the access node of the second network can determine whether the number of wireless devices in communication with the access node exceeds a predetermined threshold at 512. For example, access node 110 can determine the number of wireless devices 402, 404, 404 in active communication with access node 110 and determine whether that number exceeds a device subscription value.

If the number of wireless devices in communication with the second network is less than or equal to the predetermined threshold, the access node of the second network can respond to the request and instruct the wireless device to establish a communication link and initiate authentication over the second network in 514. In addition, the access node can instruct the wireless device to disable the transceiver associated with the radio access technology of the first network in 516.

If the number of wireless devices in communication with the second network exceeds the predetermined threshold, the access node can determine a subscription parameter and compare the subscription parameter with a network criteria in 518. For example, access node 110 can determine the subscription parameter based on the number of wireless devices in communication with access node 110 and a bandwidth allocation among the number of wireless devices 102, 104, 106, where the bandwidth allocation can be an oversubscription value of access node 110.

When the subscription parameter does not exceed the network criteria, the access node can instruct the wireless device to establish a communication link and initiate authentication over the second network in 514 and further instruct the wireless device to disable the transceiver associated with the radio access technology of the first network in 516. When the subscription parameter exceeds the network criteria, the access node can instruct the wireless device to remain on the first network at 520. In addition, the access node can further instruct the wireless device to disable the transceiver associated with the radio access technology of the second network.

As illustrated in FIG. 6, a network element such as a controller node or an access node can receive an indication that a wireless device is available to transfer from a first network of a first radio access technology to a second network of a second access technology at 602. For example, access node 310 can receive a request from wireless device 308 to establish a communication link and access node 310 can send the indication to the controller node 318. Alternatively, controller node 418 can determine that wireless device 408 is available to transfer from access node 412 to access node 410.

The network element can request the number of wireless devices communicating over the second network at 604. For example, controller node 318 can request the number of wireless devices 302, 304, 306 communicating with access node 310. At 606, the network element can determine whether the number of wireless devices communicating over the second network is greater than a predetermined threshold. For example, controller node 318 can compare the number of wireless devices 302, 304, 306 in communication with access node 310 with a device subscription threshold.

When the number of wireless devices communicating over the second network is less than the predetermined threshold, the network element can instruct the wireless device to establish a communication link and initiate authentication over the second network in 608. For example, controller node 318 can send communications to access node 310 to instruct wireless device 308 to establish the communication link and initiate authentication over network 314. The network node can further instruct the wireless device to disable the transceiver associated with the radio access technology of the first network in 610.

When the number of wireless devices communicating over the second network is greater than the predetermined threshold, the network element can determine a subscription parameter and compare the subscription parameter to a network criteria in 612. For example, controller node 318 can determine the subscription parameter based on the number of wireless devices in communication with access node 310 and a bandwidth allocation among the number of wireless devices 302, 304, 306, where the bandwidth allocation can be an oversubscription value of access node 310.

When the subscription parameter is less than the network criteria, the network node can instruct the wireless device to establish a communication link and initiate authentication over the second network in 608. When the subscription parameter is greater than or equal to the network criteria, the network device can instruct the wireless device to remain on the first network at 614. For example, controller node 318 can communicate the instruction to wireless device 308 through access node 310. In addition, the network node can further instruct the wireless device to disable the transceiver associated with the radio access technology of the second network.

Figure 7:
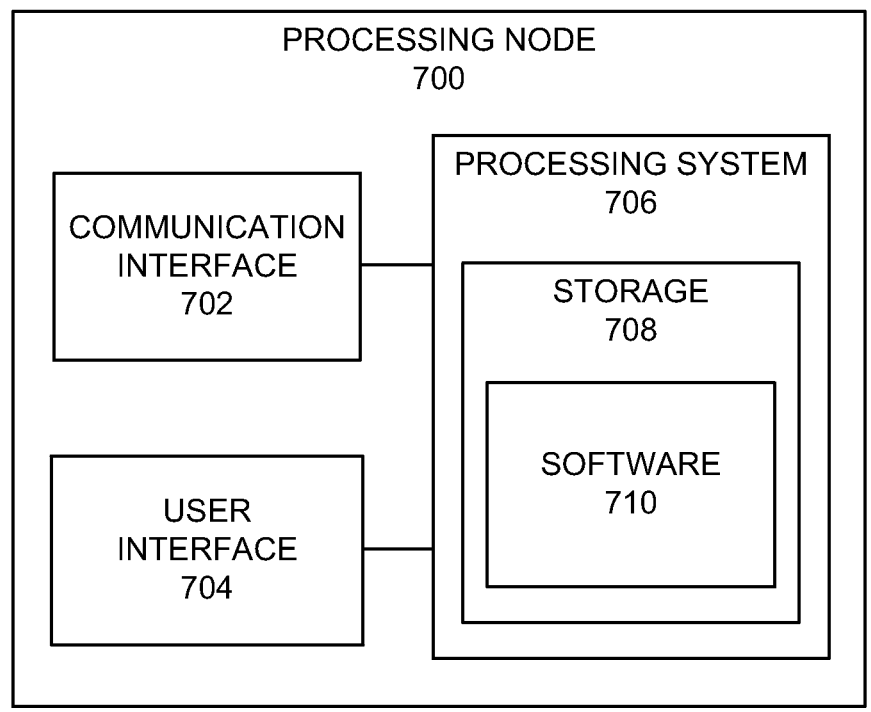
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 is capable of providing wireless communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 110, 112, 310, 312, 410, 412 and controller nodes 318, 418. Processing node 700 can also be an adjunct or component of a network element, such as an element of access nodes 110, 112, 310, 312, 410, 412 and controller nodes 318, 418. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing wireless communication to a wireless device, comprising:
    establishing, at a first access node of a first network, a first communication link with a first wireless device using a first radio access technology;
    receiving, at a detected second access node of a second network, a request to establish a second communication link with the first wireless device using a second radio access technology;
    determining, at the second access node, that a number of second wireless devices in active communication with the second access node exceeds a device subscription threshold;
    determining, at the second access node, a subscription parameter of the second access node, the subscription parameter being based on the number of second wireless devices in communication with the second access node and an oversubscription value associated with a bandwidth allocation assigned to the number of second wireless devices;
    comparing the subscription parameter with a network criteria; and
    when the subscription parameter is less than the network criteria, instructing the second access node to establish the second communication link with the first wireless device using the second radio access technology and instructing the first wireless device to initiate authentication over the second network and disable a transceiver associated with the first radio access technology.

2. The method of claim 1, further comprising:
    receiving at the second access node a request from the first wireless device for a communication link characteristic based on communications between the first access node and the first wireless device.

3. The method of claim 2, wherein the communication link characteristic comprises at least one of a RSSI value, a throughput value, a signal-to-noise ratio value, and a radio type value.

4. The method of claim 1, further comprising:
    initiating authentication of the first wireless device over the second network after the second communication link between the second access node and the first wireless device is established.

5. The method of claim 1, further comprising:
    establishing the second communication link between the second access node and the first wireless device when the number of second wireless devices in communication with the second access node is less than the device subscription threshold; and
    initiating authentication of the first wireless device over the second network after the second communication link between the second access node and the first wireless device is established.

6. The method of claim 1, further comprising:
    instructing the first wireless device to disable a transceiver of the first wireless device associated with the second radio access technology when the subscription parameter exceeds the network criteria.

7. The method of claim 1, wherein the first radio access technology network comprises a cellular protocol and the second radio access technology comprises at least one of a WiFi protocol, a Bluetooth protocol, a Zigbee protocol, and an IrDA protocol.

8. A method of communication with a wireless device, comprising:
    receiving, at a controller node, a request to establish a communication session with a first wireless device in communication with a first network associated with a first radio access technology, wherein the request is communicated to an access node of a second network associated with a second radio access technology;
    determining, at the controller node, that a number of second wireless devices in communication with the access node meets a device subscription threshold;
    determining, at the controller node, a subscription parameter of the access node, the subscription parameter being based on bandwidth allocation among the number of second wireless devices in communication with the access node
    comparing the subscription parameter with a network criteria; and
    when the first wireless device is designated higher priority in the second network over at least one of the second wireless devices in communication with the access node and the subscription parameter is less than the network criteria, instructing the access node to establish a communication link with the prioritized first wireless device using the second radio access technology and instructing the prioritized first wireless device to initiate authentication over the second network and disable a transceiver associated with the first radio access technology.

9. The method of claim 8, wherein the subscription parameter comprises the number of second wireless devices in communication with the access node and an oversubscription value of the access node based on the bandwidth allocation among the number of second wireless devices in communication with the access node.

10. The method of claim 8, further comprising:
authenticating the first wireless device over the second network after the communication link between the access node and the first wireless device is established.

11. The method of claim 8, further comprising:
authenticating the first wireless device over the second network when the number of second wireless devices in communication with the access node is less than the device subscription threshold.

12. The method of claim 8, further comprising:
instructing the first wireless device to disable a transceiver of the first wireless device associated with the second radio access technology when the subscription parameter exceeds the network criteria.

13. The method of claim 8, further comprising:
re-determining, at the controller node, the subscription parameter of the access node after the prioritized first wireless device has established the communication link over the second network.

14. The method of claim 8, wherein the first radio access technology comprises a cellular protocol and the second radio access technology comprises at least one of a WiFi protocol, a Bluetooth protocol, a Zigbee protocol, and an IrDA protocol.

15. A system for communicating with a wireless device, comprising:
a processing node configured to:
receive a request to establish a second communication session from a first wireless device over a first network associated with a first radio access technology, the first wireless device having an established first communication session over a second network associated with a second radio access technology;
determine that a number of second wireless devices in active communication over the first network using the first radio access technology exceeds a device subscription threshold;
determine a subscription parameter, the subscription parameter being based on the number of second wireless devices in communication over the first network using the first radio access technology and an over-subscription value associated with a bandwidth allocation assigned to the number of second wireless devices;
compare the subscription parameter with a network criteria; and
when the subscription parameter meets the network criteria, instruct the first wireless device establish a communication link over the first network using the first radio access technology and to disable a transceiver associated with the second radio access technology.

16. The system of claim 15, wherein the processing node is a controller node.

17. The system of claim 15, wherein the processing node is an access node of the first network.

18. The system of claim 15, wherein the processing node is further configured to:
receive a request from the first wireless device for a communication link characteristic of communications between the first network and the first wireless device.

19. The system of claim 15, wherein the first radio access technology comprises at least one of a WiFi protocol, a Bluetooth protocol, a Zigbee protocol, and an IrDA protocol and the second radio access technology comprises a cellular protocol.

* * * * *